(12) United States Patent
Di Teodoro

(10) Patent No.: US 12,555,970 B2
(45) Date of Patent: Feb. 17, 2026

(54) ARCHITECTURE FOR HIGH-POWER THULIUM-DOPED FIBER AMPLIFIER

(71) Applicant: Raytheon Company, Waltham, MA (US)

(72) Inventor: Fabio Di Teodoro, Hacienda Heights, CA (US)

(73) Assignee: Raytheon Company, Arlington, VA (US)

( * ) Notice: Subject to any disclaimer, the term of this patent is extended or adjusted under 35 U.S.C. 154(b) by 945 days.

(21) Appl. No.: 17/505,472

(22) Filed: Oct. 19, 2021

(65) Prior Publication Data
US 2023/0119153 A1 Apr. 20, 2023

(51) Int. Cl.
*H01S 3/067* (2006.01)
*H01S 3/094* (2006.01)
*H01S 3/16* (2006.01)
*H01S 3/23* (2006.01)

(52) U.S. Cl.
CPC ...... *H01S 3/06716* (2013.01); *H01S 3/06745* (2013.01); *H01S 3/0675* (2013.01); *H01S 3/094042* (2013.01); *H01S 3/1616* (2013.01); *H01S 3/2308* (2013.01)

(58) Field of Classification Search
CPC ............. H01S 3/1616; H01S 3/094042; H01S 3/06745; H01S 3/2308
See application file for complete search history.

(56) References Cited

U.S. PATENT DOCUMENTS

| | | | |
|---|---|---|---|
| 5,778,129 A * | 7/1998 | Shukunami | H01S 3/06708 385/127 |
| 5,864,644 A | 1/1999 | DiGiovanni et al. | |
| 6,295,304 B1 * | 9/2001 | Koch | H01S 3/0675 372/102 |
| 7,209,615 B2 | 4/2007 | Fishteyn | |
| 7,557,986 B2 * | 7/2009 | Sintov | H01S 3/06754 359/341.1 |

(Continued)

FOREIGN PATENT DOCUMENTS

CN 106848816 A * 6/2017

OTHER PUBLICATIONS

Creeden et al., "Resonantly Pumped Tm-Doped Fiber Laser with >90% Slope Efficiency", Feb. 1, 2014, Optics Letters, vol. 39, No. 3, 470-473. (Year: 2014).*

(Continued)

*Primary Examiner* — Joshua King

(57) ABSTRACT

A system includes multiple first thulium-doped fiber lasers each configured to generate pumplight. The system also includes a second thulium-doped fiber laser configured to receive the pumplight from the first thulium-doped fiber lasers and a seed signal. The second thulium-doped fiber laser is also configured to amplify the seed signal using the pumplight. The first thulium-doped fiber lasers are configured to forward-pump the second thulium-doped fiber laser. The second thulium-doped fiber laser includes a fiber gain medium, where the fiber gain medium includes a core doped with thulium and a cladding. The fiber gain medium is longitudinally up-tapered such that a diameter of the core and a diameter of the cladding increase along at least a portion of a length of the fiber gain medium.

20 Claims, 6 Drawing Sheets

(56) References Cited

U.S. PATENT DOCUMENTS

| | | | |
|---|---|---|---|
| 7,768,700 B1* | 8/2010 | Savage-Leuchs | H01S 3/094007 359/341.1 |
| 7,822,077 B2 | 10/2010 | Rice | |
| 8,611,003 B2* | 12/2013 | Ahn | H01S 3/094007 359/341.1 |
| 8,705,166 B1 | 4/2014 | Savage-Leuchs | |
| 8,873,134 B2 | 10/2014 | Price et al. | |
| 9,025,239 B2 | 5/2015 | Zhu | |
| 9,031,098 B1* | 5/2015 | Soh | H01S 3/113 372/6 |
| 9,166,357 B1 | 10/2015 | Moulton et al. | |
| 9,484,706 B1 | 11/2016 | Koponen et al. | |
| 9,627,838 B2 | 4/2017 | Creeden et al. | |
| 9,952,315 B2 | 4/2018 | Boland et al. | |
| 10,114,107 B2 | 10/2018 | Boland et al. | |
| 10,838,155 B2 | 11/2020 | Kopp et al. | |
| 2003/0063629 A1* | 4/2003 | Davis | H01S 3/0675 372/6 |
| 2004/0196537 A1* | 10/2004 | Starodoumov | H01S 3/094003 359/341.3 |
| 2005/0207454 A1* | 9/2005 | Starodoumov | H01S 5/146 372/4 |
| 2005/0207455 A1* | 9/2005 | MacCormack | H01S 3/094003 372/6 |
| 2006/0280217 A1 | 12/2006 | Zervas et al. | |
| 2009/0080835 A1* | 3/2009 | Frith | G02B 6/14 372/6 |
| 2011/0122895 A1* | 5/2011 | Savage-Leuchs | H01S 3/0941 372/10 |
| 2012/0057220 A1* | 3/2012 | Langseth | H01S 3/094053 372/6 |
| 2012/0127563 A1* | 5/2012 | Farmer | G02B 6/14 359/341.3 |
| 2013/0322470 A1* | 12/2013 | Creeden | H01S 3/094042 372/6 |
| 2013/0322819 A1* | 12/2013 | Holland | G02B 6/262 385/31 |
| 2016/0099538 A1* | 4/2016 | Johnson | H01S 3/094015 372/6 |
| 2018/0109064 A1* | 4/2018 | Kanskar | H01S 3/06729 |
| 2018/0151998 A1* | 5/2018 | Johnson | H01S 3/094042 |
| 2019/0140416 A1* | 5/2019 | Abedin | H01S 3/06758 |

OTHER PUBLICATIONS

Paschotta, "Double-Clad Fibers", Mar. 6, 2006, https://www.rp-photonics.com/double_clad_fibers.html. (Year: 2006).*

Sincore et al., "High Average Power Thulium-Doped Silica Fiber Lasers: Review of Systems and Concepts", IEEE Journal of Selected Topics in Quantum Electronics, vol. 24, No. 3, May/Jun. 2018, 8 pages.

Ramirez-Martinez et al., "Highly efficient thulium-doped high-power laser fibers fabricated by MCVD", Optics Express, vol. 27, No. 1, Jan. 2019, 6 pages.

Creeden et al., "Resonantly pumped Tm-doped fiber laser with >90% slope efficiency", Optics Letters, vol. 39, No. 3, Feb. 2014, 4 pages.

Creeden et al., "High power resonant pumping of Tm-doped fiber amplifiers in core- and cladding-pumped configurations", Optics Express, vol. 22, No. 23, Nov. 2014, 14 pages.

Petrov et al., "Picosecond Yb-doped tapered fiber laser system with 1.26 MW peak power and 200 W average output power", Nature Research, Scientific Reports, 2020, 8 pages.

Bobkov et al., "Sub-MW peak power diffraction-limited chirped-pulse monolithic Yb-doped tapered fiber amplifier", Optics Express, vol. 25, No. 22, Oct. 2017, 15 pages.

Filippov et al., "Highly efficient 750 W tapered double-clad ytterbium fiber laser", Optics Express, vol. 18, No. 12, Jun. 2010, 14 pages.

Wang et al., "High power tandem-pumped thulium-doped fiber laser", Optics Express, vol. 23, No. 3, Feb. 2015, 8 pages.

Li et al., "2240 W high-brightness 1018nm fiber laser for tandem pump application", Laser Physics Letters, Nov. 2017, 5 pages.

Panbiharwala et al., "Design and Demonstration of an All-Fiber Tandem Pumped Master Oscillator Power Amplifier", International Conference on Fibre Optics and Photonics 2016, Dec. 2016, 3 pages.

Laperle et al., "Fiber Optics for High-Power Applications", photonics.com, Jan. 2021, 14 pages.

Zhu et al., "Yb-doped large mode area fiber for beam quality improvement using local adiabatic tapers with reduced dopant diffusion", Optics Express, vol. 26, No. 13, Jun. 2018, 10 pages.

Jeong et al., "Continuous wave single transverse mode laser oscillation in a Nd-doped large core double clad fiber cavity with concatenated adiabatic tapers", Optics Communications, Sep. 2002, 5 pages.

OFS Fitel, LLC, "Pump and Signal Combiners for Fiber Laser and Amplifier Design", www.ofsoptics.com, Aug. 2017, 8 pages.

Agrawal, "Nonlinear Fiber Optics, Third Edition, Chapter 8 Stimulated Raman Scattering", Optics and Photonics, Academic Press, 2001, 11 pages.

Hardy et al., "Signal Amplification in Strongly Pumped Fiber Amplifiers", IEEE Journal of Quantum Electronics, vol. 33, No. 3, Mar. 1997, 7 pages.

Ma et al., "Kilowatt-level Yb-Raman fiber amplifier with narrow-linewidth and near-diffraction-limited beam quality", arXiv:1910.12215, Oct. 2019, 7 pages.

Obaid et al., "Novel Flat-Gain L-band Raman/Er—Yb Co-doped Fiber Hybrid Optical Amplifier for High Capacity DWDM System", Optik—International Journal for Light and Electron Optics, Sep. 2018, 12 pages.

Di Teodoro et al., "High-Pulse-Contrast Fiber Laser Transmitters", U.S. Appl. No. 17/194,852, filed Mar. 8, 2021, 45 pages.

Sincore et al., "System design for a >1 KW in-band pumped thulium-doped fiber amplifier (Conference Presentation)", Proc. SPIE 10897, Fiber Lasers XVI:Technology and Systems, Mar. 2019, 5 pages.

* cited by examiner

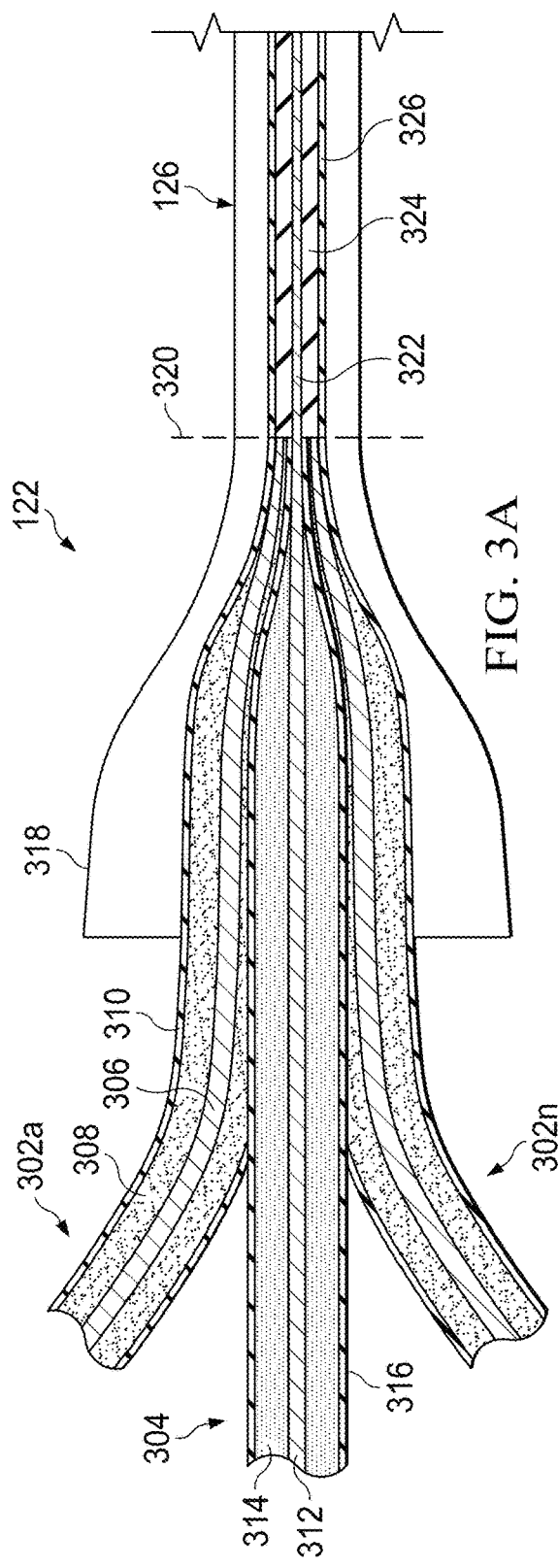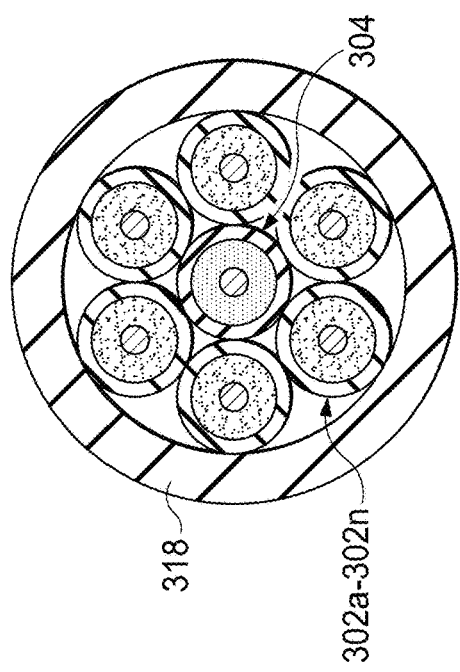
FIG. 3A
FIG. 3B

ARCHITECTURE FOR HIGH-POWER THULIUM-DOPED FIBER AMPLIFIER

TECHNICAL FIELD

This disclosure is generally directed to laser systems. More specifically, this disclosure is directed to an architecture for a high-power thulium-doped fiber amplifier.

BACKGROUND

Fiber lasers have emerged as the solution of choice for applications involving high emitted optical powers; good beam qualities; low size, weight, and power (SWaP) consumptions; and rugged builds suitable for use in field-deployed platforms. However, some applications (such as directed energy and advanced long-range sensing applications) can have challenging performance requirements, which may strain fiber laser designs. For example, application requirements such as high average output powers, high beam qualities, and eye-safe emissions with single-frequency spectral qualities may exist in certain applications.

SUMMARY

This disclosure provides an architecture for a high-power thulium-doped fiber amplifier.

In a first embodiment, a system includes multiple first thulium-doped fiber lasers each configured to generate pumplight. The system also includes a second thulium-doped fiber laser configured to receive the pumplight from the first thulium-doped fiber lasers and a seed signal. The second thulium-doped fiber laser is also configured to amplify the seed signal using the pumplight. The first thulium-doped fiber lasers are configured to forward-pump the second thulium-doped fiber laser. The second thulium-doped fiber laser includes a fiber gain medium, where the fiber gain medium includes a core doped with thulium and a cladding. The fiber gain medium is longitudinally up-tapered such that a diameter of the core and a diameter of the cladding increase along at least a portion of a length of the fiber gain medium.

In a second embodiment, a method includes generating pumplight using each of multiple first thulium-doped fiber laser. The method also includes receiving the pumplight from the first thulium-doped fiber lasers and a seed signal at a second thulium-doped fiber laser. The method further includes amplifying the seed signal based on the pumplight using the second thulium-doped fiber laser. The first thulium-doped fiber lasers forward-pump the second thulium-doped fiber laser. The second thulium-doped fiber laser includes a fiber gain medium, where the fiber gain medium includes a core doped with thulium and a cladding. The fiber gain medium is longitudinally up-tapered such that a diameter of the core and a diameter of the cladding increase along at least a portion of a length of the fiber gain medium.

In a third embodiment, a system includes multiple first thulium-doped fiber lasers each configured to generate pumplight. The system also includes a second thulium-doped fiber laser configured to receive the pumplight from the first thulium-doped fiber lasers and a seed signal. The second thulium-doped fiber laser is also configured to amplify the seed signal using the pumplight and generate an output beam having an average power level of at least 1 kW. The first thulium-doped fiber lasers are configured to forward-pump the second thulium-doped fiber laser. The second thulium-doped fiber laser includes a fiber gain medium, where the fiber gain medium includes a core doped with thulium and a cladding. The fiber gain medium is longitudinally up-tapered such that a diameter of the core and a diameter of the cladding increase along at least a portion of a length of the fiber gain medium. The second thulium-doped fiber laser also includes a signal combiner, where the signal combiner includes multiple pigtail fibers configured to receive the pumplight from the first thulium-doped fiber lasers and the seed signal from the seed laser source. Each of the multiple pigtail fibers is longitudinally down-tapered such that a diameter of at least a cladding of the pigtail fiber decreases along at least a portion of a length of the pigtail fiber.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A and 3B illustrate an example signal combiner in a high-power thulium-doped fiber amplifier according to this disclosure;

DETAILED DESCRIPTION

Figure 1:
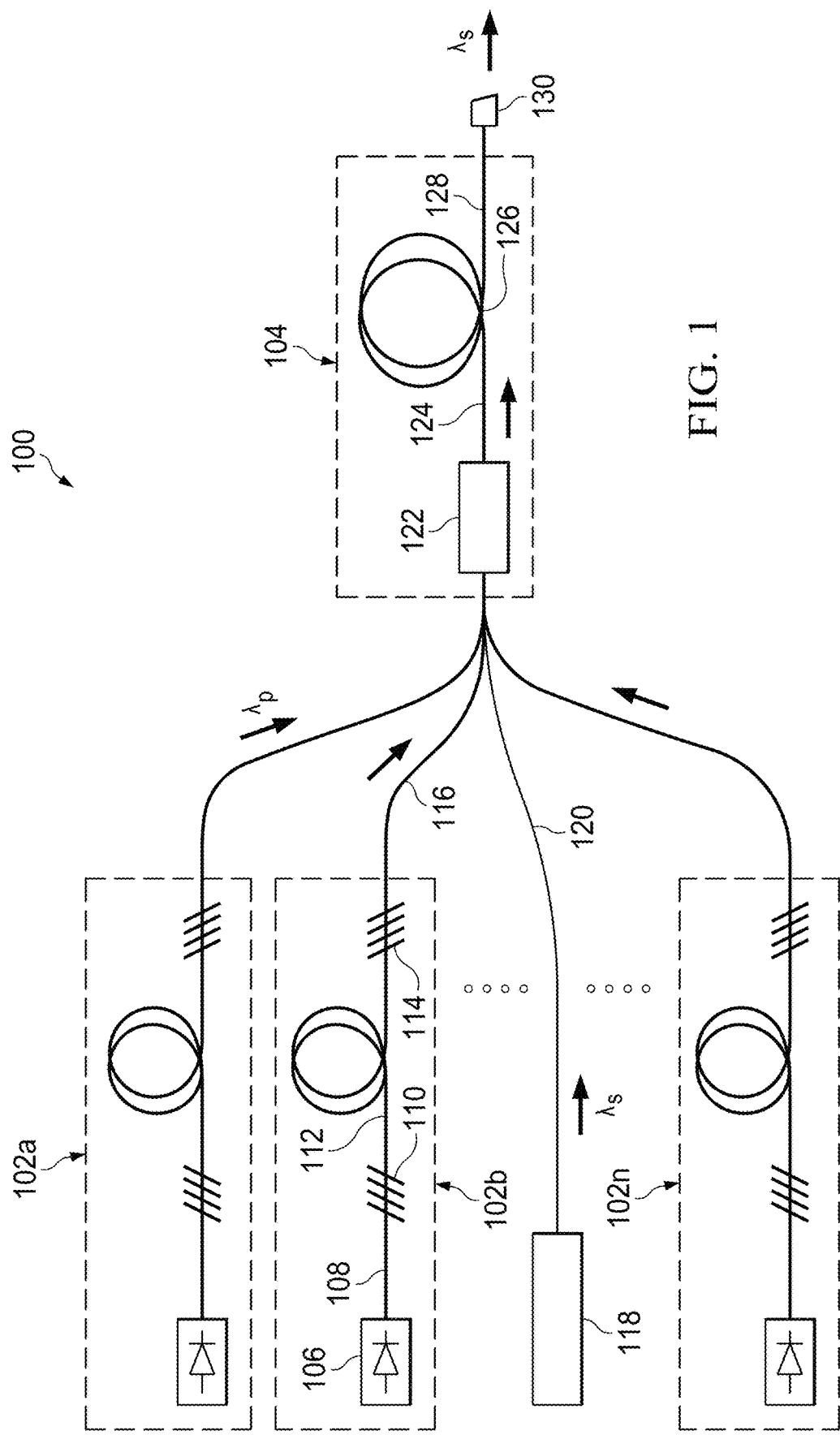
FIG. 1 illustrates an example high-power thulium-doped fiber amplifier according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, fiber lasers have emerged as the solution of choice for applications involving high emitted optical powers; good beam qualities; low size, weight, and power (SWaP) consumptions; and rugged builds suitable for use in field-deployed platforms. However, some applications (such as directed energy and advanced long-range sensing applications) can have challenging performance requirements, which may strain fiber laser designs. For example, application requirements such as high average output powers, high beam qualities, and eye-safe emissions with single-frequency spectral qualities may exist in certain applications.

In some cases, for instance, a thulium (Tm)-doped fiber laser may need to emit an output beam having an average output power at or above 1 kW while exhibiting a diffraction-limited single-transverse-mode (STM) spatial beam quality and a spectral linewidth under 1 GHz to facilitate applications such as coherent beam combining. In other cases, a thulium-doped fiber laser may need to exhibit a spectral linewidth under 1 MHz, which is consistent with requirements for various applications involving coherent active (laser-based) remote sensing like long-range frequency-modulated light detection and ranging (LiDAR) systems. In thulium-doped fiber lasers that generate kW-class average output powers, managing waste heat generated by the process of optical pumping without degrading other figures of merit (such as beam quality and SWaP) can be especially challenging.

Diode lasers are commonly used to optically pump fiber lasers in order to operate the fiber lasers as fiber amplifiers. While diode lasers have low cost, high power, and high electric-to-optical efficiency, the use of diode lasers may lead to significant quantum defect (QD) within a fiber laser. The quantum defect of a fiber laser is defined as:

$$QD = 1 - \lambda_{pump}/\lambda_{laser} \quad (1)$$

where $\lambda_{pump}$ represents the pump wavelength and $\lambda_{laser}$ represents the emission wavelength of the fiber laser. In some embodiments, for example, thulium-doped fiber lasers can be diode-pumped at a pump wavelength of about 790 nm and emit at an emission wavelength of about 2040 nm, which corresponds to a quantum defect measure of about 61%. This quantum defect measure compares very unfavorably with ytterbium (Yb)-doped fiber lasers, which are often used in high-power applications, emit at non-eye-safe wavelengths (such as about 1 μm), and have a quantum defect measure of less than 10%. Larger quantum defect measures correspond to lower optical-to-optical efficiencies (OOEs) and greater amounts of waste heat deposited into a fiber.

The presence of excess waste heat in a fiber laser may increase the temperature at its fiber's outer surface beyond the softening point of a fiber jacket's material(s), such as to about 100° C. or more. This can actually lead to mechanical failure of the fiber amplifier. Increasing the thulium doping concentration in the core of a thulium-doped fiber laser can be used to increase its optical-to-optical efficiency through a process of resonant inter-ion cross-relaxation, which can (in principle) double the quantum efficiency of the fiber laser since two photons are emitted for each pump photon absorbed and potentially lead to an optical-to-optical efficiency in excess of 70%. However, the increased optical-to-optical efficiency does not solve the thermal management issues for the thulium-doped fiber laser. Rather, the high thulium doping concentrations (typically in excess of 5% by oxide weight) that are needed to realize a strong cross-relaxation effect, combined with a high value of the absorption cross-section (such as about $9\times10^{-25}$ m$^2$) at a pump wavelength about 790 nm, can result in a high pump absorption per unit length. Consequently, the heat load (which is defined as the waste heat deposited per unit length) can be unchanged or may even be worse in terms of fiber jacket overheating and failure when high thulium doping concentrations are used.

Some approaches attempt to overcome these problems by designing specialty fibers that differ significantly from standard step-refractive-index fibers. However, new specialty fiber development is generally a risky and lengthy process since it often involves materials research. Other approaches attempt to overcome these problems by using resonant pumping, which involves replacing diode lasers operating around 790 nm with alternative pump sources that can directly excite "in-band" transitions from $^3H_6$ (ground state) to $^3F_4$ (lasing state) in thulium ions. The alternative pump sources may include one or more thulium-doped fiber lasers designed to operate at relatively-short wavelengths, such as about 1900 nm to about 1950 nm, since light in this spectral region falls within the "red" tail end of the $^3F_4$ absorption cross-section and can therefore be used to optically pump thulium ions. This pumping scheme is often referred to as "tandem pumping" to capture the idea that one or more thulium-doped fiber lasers are used to pump another thulium-doped fiber laser, where the latter thulium-doped fiber laser operates at a relatively-longer wavelength (such as about 2040 nm) falling within a window of good atmospheric transmission. With resonant or tandem pumping, the quantum defect measure can drop to less than 7%, which is comparable to or even lower than that of diode-pumped Yb-doped fibers and which simplifies thermal management.

The absorption cross-section of thulium ions at tandem-pumping wavelengths is lower (such as less than $0.5\times10^{-25}$ m$^2$) than that at about 790 nm by over an order of magnitude. As a result, a solution can be implemented to make sure that a pump beam at about 1900 nm to about 1950 nm is completely absorbed within a pumped thulium-doped fiber laser without the need for extremely long fibers. This can be useful since extremely long fibers may not be compatible, for example, with the concurrent need to minimize nonlinear optical effects at high emitted optical powers. One approach here can involve core pumping, which maximizes the cross-sectional spatial overlap between the in-fiber pump mode field and the thulium doping distribution in the core. However, core pumping is inherently not power-scalable because, in practically-relevant situations, the pumped thulium-doped fiber laser features an STM core and can only be pumped by a single additional STM thulium-doped fiber laser. While architectures in which multiple STM tandem-pumping thulium-doped fiber lasers are combined (either coherently or spectrally) to increase power while maintaining STM beam quality are theoretically possible, the outputs of such architectures would typically be free-space outputs rather than fiber-delivered outputs, which may be difficult to couple back into the core of the pumped thulium-doped fiber laser.

It may therefore be more practical to pursue cladding-pumped all-fiber-based architectures in which outputs from multiple STM pumping thulium-doped fiber lasers are spatially combined into a multi-mode exit fiber, which in turn is spliced to a pumped thulium-doped fiber laser such that the multi-mode fiber is brightness-matched to the pump cladding of the pumped thulium-doped fiber laser. Since pump absorption per unit length in cladding-pumped fibers is proportional to the core/cladding cross-sectional area ratio, a suitable tandem-cladding-pumped thulium-doped fiber laser can feature a fiber having a relatively-small pump cladding, as well as a high thulium doping concentration.

Unfortunately, optical bleaching of the thulium ion absorption can become a problem for sufficiently-high pump optical intensities, such as those attained in kW-class thulium-doped fiber lasers. Optical bleaching (which is also often referred to as saturation) can drastically reduce the pump absorption per unit length and largely offset the benefit of a high core/cladding area ratio in cladding-pumped architectures or even in core-pumped architectures. This is because it may be necessary to use longer fibers to compensate for the lower "bleached" pump absorption per unit length, but the use of longer fibers lowers the threshold power for unwanted nonlinear parasitics such as stimulated Brillouin scattering (SBS) or four-wave mixing.

This disclosure provides an architecture for a high-power thulium-doped fiber amplifier. As described in more detail below, the thulium-doped fiber amplifier uses a tandem-pumping approach in which multiple pumping thulium-doped fiber lasers are used to generate pumplight for a pumped thulium-doped fiber laser. Because of a small pump quantum defect, the heat load in the pumped thulium-doped fiber laser is much less compared to being pumped directly using diode lasers. For instance, the pumped thulium-doped fiber laser can be pumped by the pumping thulium-doped fiber lasers at about 1900 nm to about 1950 nm, rather than by diode lasers operating at about 790 nm. Moreover, the pumped thulium-doped fiber laser may include or be associated with a tapered fiber-bundle signal combiner that can be used to effectively combine a seed signal from a seed signal source and the pumplight from the pumping thulium-doped fiber lasers. This allows for effective coupling of the seed signal and the pumplight into the pumped thulium-doped fiber laser. In some cases, the seed signal source may generate a seed signal having a wavelength of about 2040 nm. In addition, the pumped thulium-doped fiber laser may include a longitudinally up-tapered thulium-doped fiber, which in some cases may operate as a single-frequency fiber amplifier. The up-tapering helps to compensate for optical bleaching of the thulium ion absorption within the core of the pumped thulium-doped fiber laser.

Using this type of design, the high-power thulium-doped fiber amplifier can support kW-class operation using tandem-pumping while providing effective pump absorption over a relatively-short fiber. This design can reduce or avoid problems associated with optical bleaching, which enables tandem-pumped thulium-doped fiber laser architectures to be designed for power scaling up to and above 1 kW. Moreover, these architectures can be used to obtain high spectral brightness and high efficiency, and these architectures can use simplified thermal management approaches to cool the fiber lasers. Further, these architectures can provide strong mitigation of unwanted nonlinear effects, which enables use of these architectures in demanding coherent applications and other suitable optical applications. For instance, the reduced length of the pumped thulium-doped fiber laser can help to significantly reduce or prevent stimulated Brillouin scattering, four-wave mixing, and modulation instability. In addition, at least a majority and possibly much more of the signal power growth can occur in a portion of the pumped thulium-doped fiber laser where the core diameter is larger (which further helps reduce stimulated Brillouin scattering), while adiabatic tapering of the pumped thulium-doped fiber laser helps to maintain the fundamental-mode operation throughout the enlarged portion of the pumped thulium-doped fiber laser (which leads to good exit beam quality).

FIG. 1 illustrates an example high-power thulium-doped fiber amplifier 100 according to this disclosure. As shown in FIG. 1, the fiber amplifier 100 supports a tandem-pumping approach in which multiple thulium-doped fiber lasers 102a-102n are used to pump an additional thulium-doped fiber laser 104. For this reason, the thulium-doped fiber lasers 102a-102n may be referred to as "pumping" fiber lasers, while the thulium-doped fiber laser 104 may be referred to as "pumped" fiber laser. In this example, there are n pumping fiber lasers 102a-102n shown as being used to pump the pumped fiber laser 104, where n is an integer greater than or equal to two.

In this example, each pumping fiber laser 102a-102n includes a diode laser 106, which generally operates to produce optical energy at a specified wavelength or in a specified wavelength range. In some embodiments, the diode lasers 106 can operate to produce optical energy having a specified nominal wavelength, such as a wavelength of about 790 nm. Note, however, that the diode lasers 106 may operate at any other suitable wavelength(s). Each diode laser 106 includes any suitable semiconductor device configured to generate optical energy.

The diode laser 106 in each pumping fiber laser 102a-102n may provide optical energy over an optical fiber 108. Any suitable type of optical fiber 108 may be used here, such as a multi-mode delivery fiber. In some cases, the diode laser 106 in each pumping fiber laser 102a-102n may be fusion-spliced to the associated optical fiber 108.

A fiber Bragg grating (FBG) 110 in each pumping fiber laser 102a-102n may be optically positioned before a fiber gain medium 112 in that pumping fiber laser 102a-102n. The fiber Bragg grating 110 is highly reflective at a wavelength or a wavelength range that is generated by the fiber gain medium 112. For example, the fiber Bragg grating 110 may be highly reflective at wavelengths in the range from about 1900 nm to about 1950 nm. In some cases, the fiber Bragg grating 110 may be fusion-spliced to the optical fiber 108 and to the fiber gain medium 112, such as when an input fiber pigtail of the fiber Bragg grating 110 is coupled to the optical fiber 108 and an output fiber pigtail of the fiber Bragg grating 110 is coupled to the fiber gain medium 112. Note, however, that the optical fiber 108 may represent the input fiber pigtail of the fiber Bragg grating 110 such that a separate optical fiber 108 is not required.

The fiber gain medium 112 in each pumping fiber laser 102a-102n represents an optical fiber in which amplification of the optical energy from the associated diode laser 106 occurs. The optical fiber of each fiber gain medium 112 represents a thulium-doped fiber, which operates as the gain medium for the associated pumping fiber laser 102a-102n. In some cases, the optical fiber of the fiber gain medium 112 can be double-clad. Depending on the implementation, the fiber gain medium 112 may operate as an STM fiber or as a predominantly STM fiber. In some embodiments, the concentration of thulium ions within the fiber gain medium 112 exceeds 5% by oxide weight, which can increase or maximize the cross-relaxation effect in neighboring thulium ions and thereby increase or maximize the pump quantum efficiency. In some cases, the fiber gain medium 112 may be fusion-spliced to the fiber Bragg grating 110, such as when coupled to the output fiber pigtail of the fiber Bragg grating 110.

A fiber Bragg grating 114 in each pumping fiber laser 102a-102n may be optically positioned after the fiber gain medium 112 in that fiber laser 102a-102n. The fiber Bragg grating 114 is partially reflective at the wavelength or the wavelength range that is generated by the fiber gain medium 112. For example, the fiber Bragg grating 110 may be partially reflective at wavelengths in the range from about 1900 nm to about 1950 nm. This allows each fiber Bragg grating 114 to function as a laser output coupler for the associated pumping fiber laser 102a-102n. In some cases, the fiber Bragg grating 114 may be fusion-spliced to the fiber gain medium 112, such as when an input fiber pigtail of the fiber Bragg grating 114 is coupled to the fiber gain medium 112.

Optical energy passing through the fiber Bragg grating 114 is provided to an exit delivery fiber 116, which provides the optical energy to the fiber laser 104. Any suitable type of exit delivery fiber 116 may be used here, such as a multi-mode delivery fiber. In this example, optical energy is provided primarily at a pump wavelength $\lambda_p$, such as a wavelength of about 1900 nm to about 1950 nm. In some cases, the fiber Bragg grating 114 may be fusion-spliced to the exit delivery fiber 116, such as when an output fiber pigtail of the fiber Bragg grating 114 is coupled to the exit delivery fiber 116. Note, however, that the exit delivery fiber 116 may represent the output fiber pigtail of the fiber Bragg grating 114 such that a separate exit delivery fiber 116 is not required.

In some embodiments, each fiber gain medium 112 and the fiber of each fiber Bragg grating 110, 114 may be either inherently STM fiber or large-mode-area (LMA) fiber. A fiber is an inherently STM fiber when its normalized frequency (denoted V) has a value that is less than 2.405 at the pump wavelength $\lambda_p$, where V can be calculated as:

$$V = \pi \times d \times NA \times \lambda_p^{-1} \quad (2)$$

Here, d represents the outer diameter of the core of the fiber, and NA represents the numerical aperture of the fiber. A fiber is a large-mode-area fiber when it has a one-mode or few-mode core, which is conditioned to guide and emit a beam of predominantly STM spatial quality.

Figure 2:
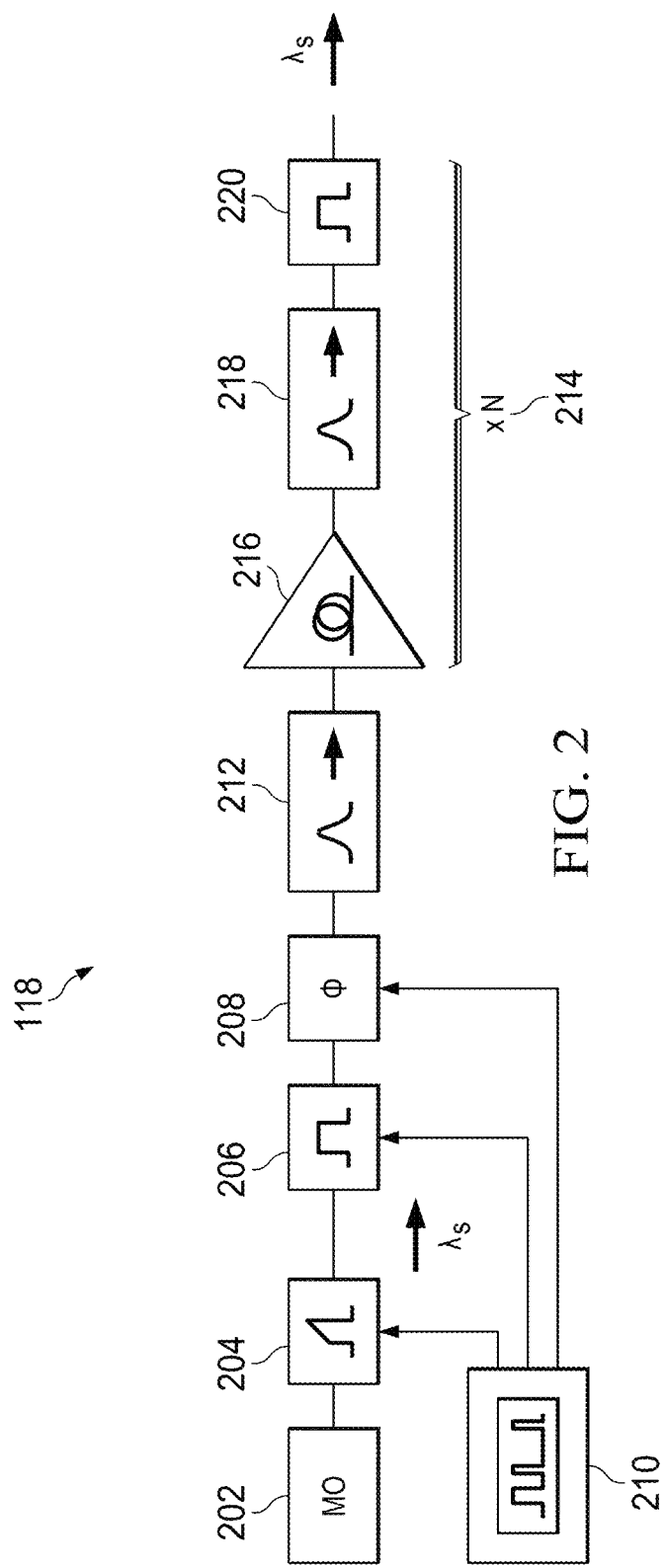
FIG. 2 illustrates an example seed laser source in a high-power thulium-doped fiber amplifier according to this disclosure.

A seed laser source 118 in FIG. 1 is used to provide a seed signal to the fiber laser 104. In this example, the seed signal can represent an optical signal primarily at a seed wavelength $\lambda_s$, such as a wavelength of about 2040 nm. In this example, the seed signal is provided to an exit delivery fiber 120, which provides the seed signal to the fiber laser 104. Any suitable type of exit delivery fiber 120 may be used here, such as a multi-mode delivery fiber. The seed laser source 118 includes any suitable structure configured to generate a seed optical signal. One example implementation of the seed laser source 118 is shown in FIG. 2, which is described below. In some cases, the seed laser source 118 may be fusion-spliced to the exit delivery fiber 120.

The pumped fiber laser 104 in this example includes a signal combiner 122, which generally operates to combine or multiplex the seed signal from the seed laser source 118 and pump signals (pumplight) from the pumping fiber lasers 102a-102n. The signal combiner 122 can output the resulting combined or multiplexed optical signals over a combiner exit fiber 124. Any suitable type of combiner exit fiber 124 may be used here, such as a multi-mode delivery fiber. The signal combiner 122 includes any suitable structure configured to combine optical signals. One example implementation of the signal combiner 122 is shown in FIGS. 3A and 3B, which are described below. In some cases, the signal combiner 122 may be fusion-spliced to the exit delivery fibers 116, 120, such as when input pigtail fibers of the signal combiner 122 are coupled to the exit delivery fibers 116, 120. Also, in some cases, the signal combiner 122 may be fusion-spliced to the combiner exit fiber 124, such as when an output fiber pigtail of the signal combiner 122 is coupled to the combiner exit fiber 124. Note, however, that the combiner exit fiber 124 may represent the output fiber pigtail of the signal combiner 122 such that a separate combiner exit fiber 124 is not required.

A fiber gain medium 126 in the pumped fiber laser 104 represents an optical fiber in which amplification of the seed signal occurs using the pump energy from the pumping fiber lasers 102a-102n. The optical fiber of the fiber gain medium 126 represents a thulium-doped fiber, which operates as the gain medium for the pumped fiber laser 104. In some cases, the optical fiber of the fiber gain medium 126 can be double-clad. Also, in some cases, the optical fiber of the fiber gain medium 126 may be fusion-spliced to the combiner exit fiber 124 or to the signal combiner 122. As described below, the optical fiber of the fiber gain medium 126 can be up-tapered, meaning the outer diameter of the optical fiber increases along at least part of the length of the optical fiber.

Figure 4:
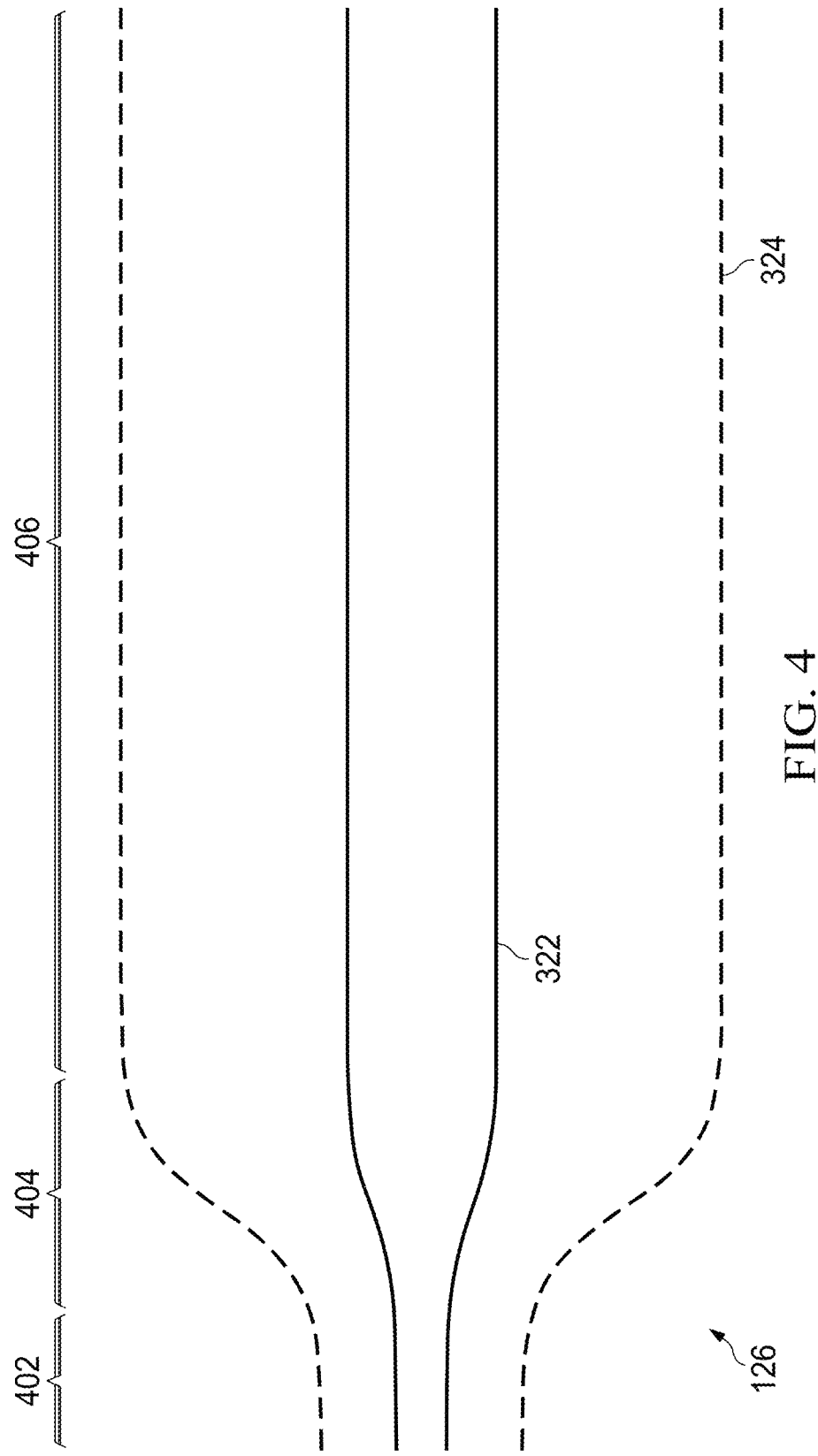
FIG. 4 illustrates an example up-tapered fiber gain medium for a pumped thulium-doped fiber laser in a high-power thulium-doped fiber amplifier according to this disclosure.

One example implementation of a pumped fiber laser 104 having a fiber gain medium 126 with an up-tapered design is shown in FIG. 4, which is described below. Note that since the seed signal from the seed laser source 118 and the pumplight from the pumping fiber laser 102a-102n are provided into the same end of the fiber gain medium 126, the fiber gain medium 126 is being forward pumped.

The output of the fiber gain medium 126 is an amplified version of the seed signal, which may be provided over an exit delivery fiber 128 and through an endcap 130. Any suitable type of exit delivery fiber 128 may be used here, such as a multi-mode delivery fiber. In some cases, the exit delivery fiber 128 may be fusion-spliced to the fiber gain medium 126 and to endcap 130. Note, however, that the exit delivery fiber 128 may be omitted if the fiber gain medium 126 can be coupled directly to the endcap 130. The endcap 130 represents any suitable structure configured to protect the exit facet of the exit delivery fiber 128 or the fiber gain medium 126, such as a beam-expanding endcap or other endcap that includes a piece of optical glass or core-less optical fiber having an output facet that is angle-polished and/or anti-reflection-coated at least at the signal wavelength. In some cases, the endcap 130 may be fusion-spliced to the exit facet of a delivery fiber or gain fiber.

During example operation of the high-power thulium-doped fiber amplifier 100 shown in FIG. 1, the thulium-doped fiber lasers 102a-102n (the pumping fiber lasers) use the diode lasers 106 to generate optical energy, such as optical energy at a wavelength of about 790 nm. The fiber gain media 112 of the thulium-doped fiber lasers 102a-102n use this optical energy to generate pumplight at one or more wavelengths $\lambda_p$, such as at a wavelength of about 1900 nm to about 1950 nm. The seed laser source 118 generates a seed signal at one or more wavelengths $\lambda_s$, such as at a wavelength of about 2040 nm. The pumplight and the seed signal are provided to the thulium-doped fiber laser 104 (the pumped fiber laser). The signal combiner 122 combines the pumplight and the seed signal into a single combined beam, and the combined beam is provided to the fiber gain medium 126 of the thulium-doped fiber laser 104. The fiber gain medium 126 amplifies the seed signal using the pumplight. As described below, the fiber gain medium 126 is cladding pumped, which means that the seed signal is provided into a core of the fiber gain medium 126 while the pumplight is provided primarily or completely into the cladding of the fiber gain medium 126. The fiber gain medium 126 generates an output beam that can be output from the high-power thulium-doped fiber amplifier 100. In some embodiments, the output beam can have a power level of at least about 1 kW and high spectral brightness.

Although FIG. 1 illustrates one example of a high-power thulium-doped fiber amplifier 100, various changes may be made to FIG. 1. For example, various components in FIG. 1 may be combined, further subdivided, replicated, omitted, or rearranged and additional components may be added according to particular needs. Also, the functions of the various components used in FIG. 1 may be implemented in any suitable manner. In addition, the specific wavelengths, coupling techniques, and other specific details provided above are for illustration only and can vary as needed or desired.

FIG. 2 illustrates an example seed laser source 118 in a high-power thulium-doped fiber amplifier 100 according to this disclosure. For ease of explanation, the seed laser source 118 of FIG. 2 is described as being used in the high-power thulium-doped fiber amplifier 100 of FIG. 1. However, the seed laser source 118 of FIG. 2 may be used in any other suitable high-power thulium-doped fiber amplifier, and the high-power thulium-doped fiber amplifier 100 of FIG. 1 may include any other suitable seed laser source 118.

As shown in FIG. 2, the seed laser source 118 represents an all-fiber-based source of a seed signal, such as a signal having a seed wavelength $\lambda_s$. In this example, the seed laser source 118 includes a master oscillator 202, which generally operates to produce an initial optical signal. The master oscillator 202 includes any suitable structure configured to generate an optical signal, such as one or more laser diodes or other laser source. In some embodiments, the master oscillator 202 may include a single-frequency laser source. In particular embodiments, the master oscillator 202 may include a fiber-coupled distributed-feedback semiconductor laser or a distributed Bragg reflector semiconductor laser. Depending on the implementation, the master oscillator 202 may utilize polarization-maintaining (PM) fibers. The optical signal generated by the master oscillator 202 may have any desired wavelength or wavelengths. As a particular example, the master oscillator 202 may generate an optical signal having a wavelength of about 2000 nm to about 2050 nm.

The seed laser source 118 may optionally include an amplitude modulator 204, a time gate 206, and/or a phase modulator 208. The amplitude modulator 204 may optionally be used to alter the amplitude of the optical signal emitted by the master oscillator 202, thereby helping to form distinct pulses in the optical signal. The amplitude modulator 204 includes any suitable structure configured to controllably alter the amplitude of an optical signal. In some embodiments, the amplitude modulator 204 may include a Mach-Zehnder interferometer embedded in an electro-optically active crystal, such as a fiber-coupled lithium-niobate modulator. In other embodiments, the amplitude modulator 204 may include one or more fiber-coupled electro-absorptive devices, such as one featuring a semiconductor chip that exhibits optical absorption that is voltage-controlled via the Franz-Keldysh effect. In still other embodiments, the amplitude modulator 204 may include one or more current-controlled fiber-coupled semiconductor optical amplifiers operated as one or more time-gating devices (such as when operated in "switch" mode). Note that while a single amplitude modulator 204 is shown in FIG. 2, multiple amplitude modulators 204 may be used in series in order to meet specific pulse format requirements, pulse repetition frequencies, pulse durations, pulse temporal profiles/shapes, on/off extinctions, or other specifications. In some embodiments, the amplitude modulator 204 or the set of amplitude modulators 204 can generate sequences of short optical pulses, such as pulses having a one to several nanosecond duration or picosecond duration, at pulse repetition frequencies of a few kilohertz up to tens of megahertz or higher.

The time gate 206 may optionally be used as an amplitude modulator to selectively block or not block the optical signal emitted by the master oscillator 202 (which may or may not be amplitude-modulated by the amplitude modulator 204). The time gate 206 includes any suitable structure configured to selectively pass or block an optical signal. In some embodiments, the time gate 206 may represent a pulsed semiconductor optical amplifier (SOA) that can provide optical gain to offset the insertion loss of the amplitude modulator 204.

The phase modulator 208 may optionally be used to adjust the phase of the optical signal emitted by the master oscillator 202 (which may or may not be amplitude-modulated by the amplitude modulator 204 and/or the time gate 206). For example, the phase modulator 208 may be used to deliberately broaden and shape the signal spectrum of the optical signal. Among other things, this may help to inhibit the onset of unwanted nonlinear optical effects in a fiber, such as stimulated Brillouin scattering or four-wave mixing. In other embodiments, the phase modulator 208 can be driven to impart optical phase patterns in order to encode one or more data streams onto the optical signal. The phase modulator 208 includes any suitable structure configured to modulate the phase of an optical signal.

In this example, the amplitude modulator 204, the time gate 206, and/or the phase modulator 208 may be controlled using an electronic pulse driver 210. The electronic pulse driver 210 is configured to generate electrical pulses in control signals provided to the amplitude modulator 204, the time gate 206, and/or the phase modulator 208, where the electrical pulses control the operation of the amplitude modulator 204, the time gate 206, and/or the phase modulator 208. The electronic pulse driver 210 includes any suitable structure configured to generate control signals used for amplitude modulation, time gate control, and/or phase modulation, such as an arbitrary waveform generator. In some embodiments, the electronic pulse driver 210 may include a digital synthesizer, a broadband digital-to-analog converter, a radio frequency (RF) amplifier, or a voltage-controlled pulsed current source.

The optical signal emitted by the master oscillator 202 (which may or may not be modified by the amplitude modulator 204, the time gate 206, and/or the phase modulator 208) is provided to an optical filter and isolator block 212. The effective management of amplified spontaneous emissions (ASE) can be useful in obtaining high optical pulse contrast. The amplified spontaneous emissions produced in rare-earth-doped optical fibers can be spectrally broad and, in some cases, encompasses most of the fiber's optical gain spectrum. Thus, a large majority of the amplified spontaneous emissions can be rejected using a bandpass filter or other spectrally selective fiber-coupled component, which limits the frequencies/wavelengths of optical energy passing through the block 212 to a narrow spectral window (such as to within one or several nanometers of the master oscillator's wavelength) and helps to control amplified spontaneous emissions or other unwanted frequencies from propagating through the seed laser source 118. The optical isolator helps to prevent back-propagation of optical energy in the seed laser source 118, such as backward-propagating ASE, back-reflections, Rayleigh scattering, stimulated Brillouin scattering, and residual unabsorbed pump light. The filter portion of the block 212 includes any suitable structure configured to filter unwanted optical frequencies, such as a fiber-coupled optical bandpass filter, a fiber Bragg grating, or a fiber-coupled etalon filter. The isolator portion of the block 212 includes any suitable structure configured to limit the flow of optical energy to a desired direction, such as a Faraday optical isolator.

The filtered and isolated signal is used as the input to a series 214 of N preamplifier-filter/isolator units, where each unit includes a fiber-based optical preamplifier 216, an optical filter and isolator block 218, and a time gate 206. The design of the series 214 can be tailored to achieve desired characteristics, such as limiting the build-up of ASE noise, mitigating unwanted non-linear optical effects, or maximizing electric-to-optical efficiency (while maintaining an all-fiber-based layout). Each optical preamplifier 216 is configured to receive an input optical signal and generate an amplified optical signal. Each optical filter and isolator block 218 is configured to filter the amplified optical signal and reduce back-propagation of optical energy through the seed laser source 118. Each time gate 220 is configured to selectively block or not block the filtered/isolated/amplified optical signal.

Each optical preamplifier 216 includes any suitable structure configured to perform optical amplification. In some embodiments, each optical preamplifier 216 includes a thulium-doped fiber amplifier configured amplify wavelengths in the range of about 1900 nm to about 2000 nm. In these embodiments, each of the optical preamplifiers 216 may be coupled to a diode laser or other source of optical power. In other embodiments, each optical preamplifier 216 may use a gain medium other than a rare-earth-doped fiber, such as an electrically-pumped fiber-coupled semiconductor or fiber-coupled diode-pumped micro-chip, bulk, or waveguided crystal amplifier, as well as another optical amplifier that is non-fiber-optic in nature. Each optical filter and isolator block 218 may be the same as or similar to the optical filter and isolator block 212 described above. Each time gate 220 may be the same as or similar to the time gate 206 described above.

In some embodiments, the seed laser source 118 can be entirely fabricated using STM fibers or fibers operating predominantly as STM fibers, which may result in the emission of an STM beam of excellent spatial quality (such as when $M^2<1.1$). As noted above, the phase modulator 208 may optionally be used to impart phase-modulation patterns onto a signal beam, such as to broaden its spectrum and raise the threshold power for stimulated Brillouin scattering. In some cases, the broadened signal spectral linewidth may be greater than 1 GHz. In other cases, the signal spectral linewidth may be less than 1 GHz and may be only as wide as a few Hertz to maximize the signal beam coherence length. Also, in some embodiments, the seed laser source 118 may emit a pulsed output, in which case the amplitude modulator 204 and/or the time gate 206 can optionally be used. In other embodiments, the master oscillator 202 itself may be operated in a pulsed mode, such as through the use of gain-switching, Q-switching, or mode-locking. In particular embodiments, the seed laser source 118 may have an average output power of about 10 W to 100 W, although other average output powers may be used.

Although FIG. 2 illustrates one example of a seed laser source 118 in a high-power thulium-doped fiber amplifier 100, various changes may be made to FIG. 2. For example, various components in FIG. 2 may be combined, further subdivided, replicated, omitted, or rearranged and additional components may be added according to particular needs. Also, the specific wavelengths and other specific details provided above are for illustration only and can vary as needed or desired.

FIGS. 3A and 3B illustrate an example signal combiner 122 in a high-power thulium-doped fiber amplifier 100 according to this disclosure. For ease of explanation, the signal combiner 122 of FIGS. 3A and 3B is described as being used in the high-power thulium-doped fiber amplifier 100 of FIG. 1. However, the signal combiner 122 of FIGS. 3A and 3B may be used in any other suitable high-power thulium-doped fiber amplifier, and the high-power thulium-doped fiber amplifier 100 of FIG. 1 may include any other suitable signal combiner 122.

As shown in FIG. 3A, the signal combiner 122 here is implemented as a tapered fiber-bundle combiner. In this example, the signal combiner 122 includes multiple input pigtail fibers 302a-302n, each of which is configured to receive pumplight from a corresponding one of the pumping fiber lasers 102a-102n. The signal combiner 122 also includes an input pigtail fiber 304, which is configured to receive the seed signal from the seed laser source 118.

Each input pigtail fiber 302a-302n includes a core 306, a cladding 308, and an outer surface 310. Similarly, the input pigtail fiber 304 includes a core 312, a cladding 314, and an outer surface 316. Each core 306 represents a portion of the associated input pigtail fiber 302a-302n that can transport the pumplight from the corresponding pumping fiber laser 102a-102n, and the core 312 represents a portion of the input pigtail fiber 304 that can transport the seed signal. The claddings 308, 314 have different indices of refraction compared to the cores 306, 312 or are otherwise designed to allow for the transport of optical signals (pump signals or seed signal) via internal reflection. The outer surfaces 310, 316 represent fiber jackets, such as polymer coatings. In some embodiments, each of the input pigtail fibers 302a-302n, 304 is brightness matched to its associated exit delivery fiber 116 or 120, meaning each of the input pigtail fibers 302a-302n, 304 has the same or substantially the same core diameter and numerical aperture as its associated exit delivery fiber 116 or 120. This can help to preserve the STM or predominantly STM nature of the guided beams.

In some embodiments, the input pigtail fibers 302a-302n, 304 can be tightly stacked or otherwise positioned within a capillary tube 318, a portion of which is shown in FIG. 3A and a cross-section of which is shown in FIG. 3B. The capillary tube 318 may be formed from any suitable material(s), such as glass. The capillary tube 318 can be sized and shaped so that the input pigtail fibers 302a-302n, 304 form a closely-packed array or other arrangement within the capillary tube 318. One example of this is shown in FIG. 3B, where the input pigtail fiber 304 transporting the seed signal is positioned in the center of the capillary tube 318 and the input pigtail fibers 302a-302n transporting the pump signals are positioned around the input pigtail fiber 304. Note, however, that this arrangement may vary as needed or desired.

In some embodiments, the input pigtail fibers 302a-302n, 304 are longitudinally down-tapered as shown in FIG. 3A, meaning the overall outer diameters of the input pigtail fibers 302a-302n, 304 can be reduced along at least a portion of their lengths. The capillary tube 318 can have a similar tapering to support the positioning of the input pigtail fibers 302a-302n, 304. This tapering of the input pigtail fibers 302a-302n, 304 also reduces the outer diameter(s) of the cores 306, 312 and/or claddings 308, 314 of the input pigtail fibers 302a-302n, 304. This tapering reduces the overall combined cross-sectional dimension of the input pigtail fibers 302a-302n, 304 and matches or substantially matches their combined cross-sectional dimension to the cross-sectional dimension of the fiber gain medium 126. Also, in some cases, the input pigtail fibers 302a-302n, 304 can be coupled to the fiber gain medium 126 using a fusion splice 320. The center area of the bundle may be occupied by the core 312 transporting the seed signal to be amplified by the fiber gain medium 126.

In this example, the fiber gain medium 126 includes a core 322, a cladding 324, and an outer surface 326. The core 322 represents a portion of the fiber gain medium 126 that is doped with thulium and that optically amplifies the seed signal (provided by the input pigtail fiber 304 into the core 322). The cladding 324 has a different index of refraction compared to the core 322 or is otherwise designed to allow for the transport of the seed signal via internal reflection. The cladding 324 also provides the pumplight (provided by the input pigtail fibers 302a-302n into the cladding 324), which provides the energy for the optical amplification of the seed signal. The outer surface 326 represents a fiber jacket, such as a polymer coating.

Unlike typical down-tapered fiber-bundle combiners, the signal combiner 122 here supports tandem pumping while transporting STM or predominantly STM beams, even through the bundle down-tapered segment. In some cases, the outer diameters of the cores 306, 312 may not taper to less than about 10 microns or the mode field can spread significantly beyond the cores 306, 312, which leads to optical power losses. To this end, in some embodiments, the cladding 308 of each input pigtail fiber 302a-302n can be etched, such as via treatment with a chemical agent like hydrogen fluoride, to taper the cladding 308 while leaving the size of the core 306 unchanged. In these embodiments, after being etched, the bundled pigtail fibers 302a-302n, 304 can be fused to each other with minimal or no further down-tapering. In other embodiments, each of the input pigtail fibers 302a-302n, 304 may exhibit a stepwise refractive index profile, such as when one or more concentric regions or pedestals have refractive indices that increase from the outside towards the center of the input pigtail fiber 302a-302n, 304. Upon down-tapering, the initial core 306, 312 vanishes and is replaced by the surrounding pedestal so as to maintain a constant core size. In still other embodiments, other approaches for fabricating the input pigtail fibers 302a-302n, 304 can be used.

Note that it is possible to replace the signal combiner's constituent fibers (the input pigtail fibers 302a-302n, 304) with capillaries, such as those made predominantly of fused-silica glass. Each of the capillaries can form the cladding of a combiner fiber and be filled with or include a central etchable region (such as an etchable glass region). Upon down-tapering of these capillaries, each capillary's central regions can be etched away and replaced by a coreless fiber of refractive index and transverse size appropriate to form the actual core of the down-tapered capillary. The capillaries with their inner cores formed as described above can be fused together (with minimal or no further down-tapering) so that each core region acts as an STM or predominantly STM waveguide.

Although FIGS. 3A and 3B illustrate one example of a signal combiner 122 in a high-power thulium-doped fiber amplifier 100, various changes may be made to FIGS. 3A and 3B. For example, various components in FIGS. 3A and 3B may be combined, further subdivided, replicated, omitted, or rearranged and additional components may be added according to particular needs. Also, the specific wavelengths, materials, dimensions, and other specific details provided above are for illustration only and can vary as needed or desired.

FIG. 4 illustrates an example up-tapered fiber gain medium 126 for a pumped thulium-doped fiber laser 104 in a high-power thulium-doped fiber amplifier 100 according to this disclosure. For ease of explanation, the fiber gain medium 126 of FIG. 4 is described as being used in the high-power thulium-doped fiber amplifier 100 of FIG. 1. However, the fiber gain medium 126 of FIG. 4 may be used in any other suitable high-power thulium-doped fiber amplifier, and the high-power thulium-doped fiber amplifier 100 of FIG. 1 may include any other suitable fiber gain medium 126.

As shown in FIG. 4, the fiber gain medium 126 of the pumped fiber laser 104 is longitudinally up-tapered, which indicates that the outer diameter of the fiber gain medium 126 increases along at least a portion of its length. This type of fiber gain medium 126 supports operation as a single-frequency fiber amplifier supporting kW-class power. The fiber gain medium 126 can have a high core/cladding area ratio to increase pump absorption despite the low absorption cross-section at the about 1900 nm to about 1950 nm range.

In this example, the fiber gain medium 126 includes a first portion 402, which represents the input portion of the fiber gain medium 126 (which is the portion of the fiber gain medium 126 shown in FIG. 3). The first portion 402 of the fiber gain medium 126 can receive the seed signal and the pumplight from the signal combiner 122. The core 322 and the cladding 324 can have relatively small dimensions in the first portion 402 of the fiber gain medium 126, such as when the core 322 has an outer diameter of about 20 microns to about 30 microns and the cladding 324 has an outer diameter of about 50 microns to about 100 microns. In particular embodiments, the core 322 has an outer diameter of about 30 microns, and the cladding 324 has an outer diameter of about 60 microns. In some cases, the outer diameters of the core 322 and the cladding 324 may be generally consistent within the first portion 402 of the fiber gain medium 126. In other cases, the outer diameters of the core 322 and the cladding 324 may vary, such as by slightly increasing, within the first portion 402 of the fiber gain medium 126. The first portion 402 of the fiber gain medium 126 can have any suitable length, such as about one meter to about three meters.

The fiber gain medium 126 also includes a second portion 404, which represents a transition region of the fiber gain medium 126. The fiber gain medium 126 is adiabatically up-tapered within the second portion 404, which means that the size of the fiber gain medium 126 increases (ideally without losing any optical power) and the outer diameters of the core 322 and the cladding 324 gradually increase. The adiabatic tapering helps to retain good beam quality within the fiber gain medium 126. Depending on the implementation, the outer diameters of the core 322 and the cladding 324 can be increased by a factor of M, where M is a value greater than one. In some cases, M may have a value of two, three, or four.

The fiber gain medium 126 also includes a third portion 406 in which the outer diameters of the core 322 and the cladding 324 can remain constant or substantially constant. The core 322 and the cladding 324 can have relatively large outer dimensions in the third portion 406 of the fiber gain medium 126, such as when the core 322 has an outer diameter of about 40 microns to about 120 microns and the cladding 324 has an outer diameter of about 100 microns to about 400 microns. In particular embodiments, the core 322 has an outer diameter of about 60 microns, and the cladding 324 has an outer diameter of about 120 microns. The third portion 406 of the fiber gain medium 126 can have any suitable length, such as about one meter to about five meters.

As high-power pumplight is injected into the smaller cladding 324 in the first portion 402 of the fiber gain medium 126, the optical intensity of the pumplight in the cladding 324 within the first portion 402 of the fiber gain medium 126 may far exceed its saturation intensity. As a result, the thulium ions in the first portion 402 of the fiber gain medium 126 can be appreciably bleached. Thus, even though the core/cladding area ratio in the first portion 402 of the fiber gain medium 126 is high, the linear rate of pump absorption in the first portion 402 of the fiber gain medium 126 remains low, and significant pump power remains unabsorbed. The increase in the size of the cladding 324 in the second portion 404 of the fiber gain medium 126 and the increased size of the cladding 324 in the third portion 406 of the fiber gain medium 126 help to reduce the intensity of the pumplight within in the cladding 324 in the third portion 406 of the fiber gain medium 126. This reduced intensity allows the pumplight to be absorbed much more effectively in the third portion 406 of the fiber gain medium 126. Because of this, complete pump absorption can be obtained with a shorter fiber length (compared to standard LMA fiber), and most pump absorption can occur where the core 322 is larger (which is similar to backward pumping without the complication of backward pumping). Both of these can result in reduced or minimal nonlinearity within the pumped thulium-doped fiber laser 104. Overall, the length of the fiber gain medium 126 for the pumped thulium-doped fiber laser 104 can be kept to a manageable length without sacrificing absorption.

Although FIG. 4 illustrates one example of an up-tapered fiber gain medium 126 for a pumped thulium-doped fiber laser 104 in a high-power thulium-doped fiber amplifier 100, various changes may be made to FIG. 4. For example, the specific wavelengths, dimensions, and other specific details provided above are for illustration only and can vary as needed or desired. Also, the transitions in the outer diameters of the core 322 and the cladding 324 may occur more quickly or more gradually than shown here.

The following provides details of specific example implementations of the high-power thulium-doped fiber amplifier 100 and its components. Note that these details are for illustration only. Other embodiments of the high-power thulium-doped fiber amplifier 100 and/or other embodiments of the components of the high-power thulium-doped fiber amplifier 100 may be used without departing from the scope of this disclosure.

Both active (such as rare earth-doped) fibers and passive fibers can be longitudinally up-tapered and/or down-tapered, such as by varying (in a controlled fashion) the speed at which fiber preforms are thermally drawn into the fibers. It is known that the transverse modal content of a beam propagating in an up-tapering core can be effectively retained using adiabatic tapers. In these tapers, the core at the fiber input end is strictly STM (meaning V<2.405), and the linear rate of the transition from the initial smaller size to the final larger size (the rate of up-tapering) is slow enough that negligible excitation of higher-order transverse modes occurs throughout the region of changing core size and in the output portion of the fiber (which exhibits the target larger core size). In some cases, the diameter of the fiber core can be increased up to a factor of five or more using tapered transition regions of approximately one meter in length.

In a typical cladding-pumped thulium-doped fiber, the absorption per unit length can be modeled using a modified version of Beer's law, where the modification accounts for saturation or bleaching of the $^3H_6 \rightarrow {}^3F_4$ energy transitions in the thulium ions of the cladding-pumped fiber. The modified version of Beer's law can be expressed as follows.

$$\frac{dP}{dz} = -\alpha(z)P(z) \tag{3}$$

Here, P(z) represents the residual pump power at location z along the length of the fiber. Also, $\alpha(z)$ represents the saturated linear absorption coefficient of the fiber, which can be determined as follows.

$$\alpha(z) = \frac{\alpha_0}{1 + I(z)/I_{sat}} \tag{4}$$

In Equation (4), $\alpha_0 = N\sigma_\alpha(\lambda_p)$ represents the unbleached absorption coefficient, where N represents the thulium ion number density and $\sigma_\alpha(\lambda_p)$ represents the thulium ion absorption cross-section at the pump wavelength $\lambda_p$. Also, I(z) represents the residual pump optical intensity at location z along the length of the fiber, which can be approximated as $P(z)/A_{clad}$ (where $A_{clad}$ represents the pump cladding area). In addition, $I_{sat}$ represents the saturation optical intensity of the fiber, which can be determined as follows.

$$I_{sat} = \frac{hc}{\lambda_p \sigma_a(\lambda_p)\tau} \tag{5}$$

In Equation (5), h represents Planck's constant, c represents the speed of light in vacuo, and $\tau$ represents the $^3F_4$ spontaneous lifetime (which is about $4.5 \times 10^{-4}$ s).

If $A_{clad}$ remains constant along the fiber, the fiber is not tapered, and Equation (3) admits a simple closed-form solution as follows.

$$I(z) = I_{sat}W\left[\frac{I_0}{I_{sat}}\exp\left(\frac{I_0}{I_{sat}} - \alpha_0 z\right)\right] \tag{6}$$

In Equation (6), $I_0$ represents the input pump intensity and can be given by $P(0)/A_{clad}$, and W represents Lambert's W function (which is sometimes referred to as a "Product log" function).

Figure 5:
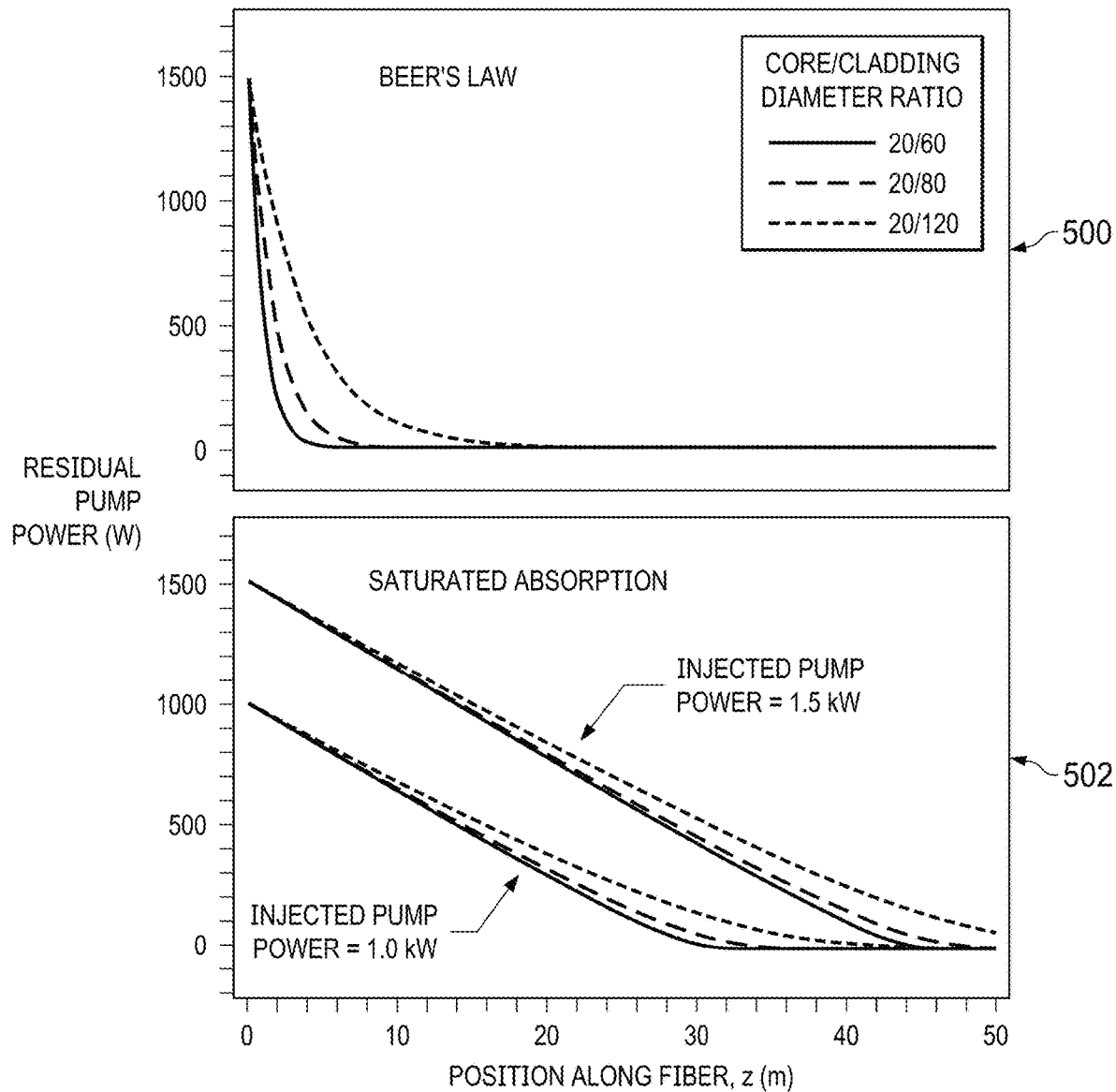
FIG. 5 illustrates example graphs plotting residual pump powers along the length of a fiber gain medium for a thulium-doped fiber laser according to this disclosure.

FIG. 5 illustrates example graphs 500, 502 plotting residual pump powers along the length of a fiber gain medium for a thulium-doped fiber laser according to this disclosure. More specifically, the graph 500 plots residual pump power in watts versus position along a thulium-doped fiber gain medium in meters, assuming 1.5 kW of optical pump power at a 1920 nm wavelength is injected in the fiber's pump cladding at the input end (meaning z=0). The absorption per unit length of the fiber gain medium here assumes an unbleached pump absorption as described by Beer's law. Different curves in the graph 500 are associated with different core/cladding diameter ratios for the fiber gain medium, such as (i) a 20-micron core and a 60-micron cladding, (ii) a 20-micron core and an 80-micron cladding, and (iii) a 20-micron core and a 120-micron cladding. It is assumed here that the thulium doping concentration of the fiber gain medium is about 7% by oxide weight.

The graph 502 plots residual pump power versus position along the fiber gain medium, assuming 1.0 kW and 1.5 kW of optical pump power at a 1920 nm wavelength is injected in the fiber's pump cladding at the input end (meaning z=0). The absorption per unit length of the fiber gain medium here assumes a bleached pump absorption. Different curves in the graph 502 are associated with the same core/cladding diameter ratios as in the graph 500. Again, it is assumed here that the thulium doping concentration of the fiber gain medium is about 7% by oxide weight. It is also assumed that bleaching occurs at a saturation optical intensity of about 1.2 MW/cm$^2$.

As can be seen here, FIG. 5 illustrates the effect of saturation on pump absorption by comparing the expression in Equation (6) with the simple (unsaturated) Beer's law, which corresponds to the limit of Equation (3) for $I_{sat} \rightarrow \infty$. The finite saturation optical intensity that characterizes the tandem-pumping absorption transition $^3H_6 \rightarrow {}^3F_4$ results in a significant departure from Beer's law. That effect is particularly evident in the case of kW-class thulium-doped fiber amplifiers for which about 1 kW or more of optical pump power is injected in the final pumped fiber laser. The final pumped fiber laser needed to achieve full tandem-pump absorption would have to be significantly longer (such as six to ten times longer) than in the absence of saturation. This might result in a fiber length of tens of meters or more. In such a lengthy fiber, the threshold power for unwanted nonlinear effects would proportionally scale down, effectively defeating the purpose of tandem-pumping due to the onset of stimulated Brillouin scattering at power levels that are far below 1 kW in the case of narrow linewidth (less than 1 GHz) amplified signals and due to the onset of four-wave mixing and modulation instability at power levels less than 1 kW regardless of spectral width. These low-threshold power nonlinearities would offset the tandem-pumping benefit of greatly simplified thermal management.

In the case of a longitudinally-tapered pumped thulium-doped fiber laser 104 as described above and used in the high-power thulium-doped fiber amplifier 100, Equation (3) can be rewritten as follows.

$$\frac{dP}{dz} = -\tilde{\alpha}(z)P(z) = -\frac{\alpha_0}{1 + \frac{P(z)}{A_{clad}(z)I_{sat}}} P(z) \quad (7)$$

In Equation (7), the cladding area $A_{clad}(z)$ is now a function of location along the length of the fiber gain medium 126, which accounts for the up-tapering. In some embodiments, for example, the cladding area $A_{clad}(z)$ may be defined as follows.

$$A_{clad}(z) = \frac{\pi}{4}\left\{d_{clad,in} + \frac{d_{clad,out} - d_{clad,in}}{2}\{1 + \tanh[\beta(z-\mu)]\}\right\}^2 \quad (8)$$

$$d_{clad}(z) = \eta\, d_{core}(z) \quad (9)$$

In Equations (8) and (9), $d_{core}(z)$ and $d_{clad}(z)$ respectively represent the outer diameters of the core 322 and the cladding 324 of the fiber gain medium 126. Also, $d_{clad,in} = d_{clad}(0)$ represents the cladding's outer diameter at the fiber input (z=0), and $d_{clad,out} = d_{clad}(L)$ represents the cladding's outer diameter at the fiber output (z=L). Further, $\beta$ represents the tapering steepness factor, which is related to how quickly the fiber up-tapers versus the distance z along the fiber's length (where z=µ denotes the location of the center of the tapered region). In addition, η represents the cladding/core diameter ratio, which may remain constant or substantially constant along the fiber gain medium 126. As a particular example, the core 322 may have core and cladding outer diameters of about 20 microns and about 80 microns, respectively, at the fiber input and core and cladding outer diameters of about 60 microns and about 240 microns, respectively, at the fiber output. This would correspond to an up-taper ratio of η=4. The tapered section of the fiber gain medium 126 may be approximate one meter in length (corresponding to a tapering steepness factor $\beta=2$) and a center located about 1.7 meters from the fiber input end.

Figure 6:
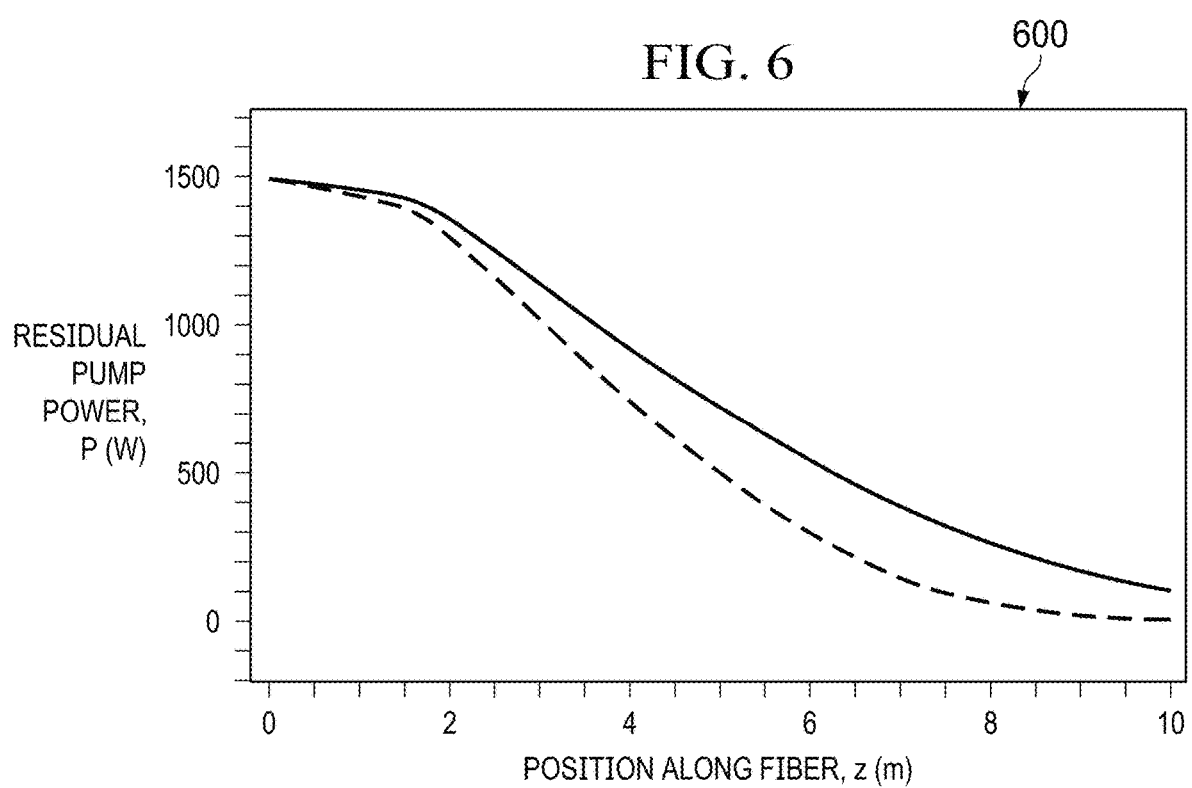
FIG. 6 illustrates an example graph plotting residual pump powers along the length of an up-tapered fiber gain medium for a pumped thulium-doped fiber laser in a high-power thulium-doped fiber amplifier according to this disclosure.

FIG. 6 illustrates an example graph 600 plotting residual pump powers along the length of an up-tapered fiber gain medium 126 for a pumped thulium-doped fiber laser 104 in a high-power thulium-doped fiber amplifier 100 according to this disclosure. More specifically, the graph 600 plots residual pump power in watts versus position along the fiber gain medium 126 of the pumped fiber laser 104 in meters, assuming 1.5 kW of optical pump power at a 1920 nm wavelength is injected in the fiber's pump cladding 324 at the input end (meaning z=0). Different curves in the graph 600 are associated with different taper ratios for the fiber gain medium 126, namely a taper ratio of four (for the solid line) and three (for the dashed line). As can be inferred through a comparison with FIG. 5, the fiber up-tapering yields near-complete pump absorption in a considerably shorter stretch of fiber compared to a typical constant-core-size LMA fiber.

In addition, the high-power thulium-doped fiber amplifier 100 offers a distinctive advantage over other implementations involving tapered fibers. Specifically, most pump absorption occurs in the larger core 322 within the third portion 406 of the fiber gain medium 126. This reduces the effective interaction length for unwanted nonlinear effects. At the same time, this beneficial behavior is obtained even though the up-tapered fiber gain medium 126 is pumped in the forward direction (meaning the fiber gain medium 126 is pumped by the pumplight is the same propagating direction as the seed signal) rather than in the counter-propagating direction. In typical tapered and un-tapered fibers, counter-propagating pumping (meaning pumplight is injected into the fiber output end) leads to strong population inversion near the output end and near-exponential power growth along the fiber with high signal power attained only in the vicinity of the fiber output end. As mentioned above, this power growth profile helps mitigate nonlinear effects. However, counter-propagating pumping is difficult to implement in kW-class fiber lasers receiving very high pump powers.

One problem that applies to various fiber configurations is that small portions of a high-power output beam can leak into a counter-pumping laser, which causes unwanted optical feedback and may lead to pump power instabilities and potential damage. Another problem specific to up-tapered fibers is pump "vignetting" in which, as a pump beam propagates from the large-core/cladding output portion of the up-tapered fiber into the small-core/cladding portion, the pump beam's numerical aperture comes to exceed the acceptance numerical aperture of the pump cladding. This allows large-angle rays to leak out of the cladding, resulting in pump power losses.

Among other features, the high-power thulium-doped fiber amplifier 100 allows most pump power to be absorbed in the large-core/cladding portion of the fiber gain medium 126 (within the third portion 406 of the fiber gain medium 126) even though the pumplight is injected from the small-core/cladding end (the input to the first portion 402 of the fiber gain medium 126) and co-propagates in the same direction as the seed signal. This occurs due to the transition from highly-bleached pump absorption in the first portion 402 of the fiber gain medium 126 to negligibly-bleached pump absorption in the third portion 406 of the fiber gain medium 126. As the pumplight propagates from the small-cladding portion (portion 402) of the fiber gain medium 126 to the large-cladding portion (portion 406) of the fiber gain medium 126, little or no vignetting and therefore little or no pump power losses may occur, which helps to enable kW-level output power operation while maintaining high optical efficiency and avoiding exposure of the fiber gain medium's outer surface and surrounding components to dangerous high-power pump-leak stray light.

Finally, as the highest power is attained in the large-core portion (portion 406) of the up-tapered fiber gain medium 126, this helps to further mitigate stimulated Brillouin scattering, four-wave mixing, and other parasitics. This is because the threshold power for unwanted nonlinear optical effects is proportional to the beam mode-field area and hence to the core area. Increasing the size of the core 322 in the third portion 406 of the fiber gain medium 126 increases the threshold power needed for unwanted nonlinear optical effects to appear.

Although FIG. 5 illustrates examples of graphs 500, 502 plotting residual pump powers along the length of a fiber gain medium for a thulium-doped fiber laser and FIG. 6 illustrates one example of a graph 600 plotting residual pump powers along the length of an up-tapered fiber gain medium 126 for a pumped thulium-doped fiber laser 104 in a high-power thulium-doped fiber amplifier 100, various changes may be made to FIGS. 5 and 6. For example, the contents of FIGS. 5 and 6 are for illustration only and can vary based on the actual laser gain media being used. FIGS. 5 and 6 are merely meant to illustrate one example of the types of benefits that may be obtained in accordance with the teachings of this disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   multiple thulium-doped pumping fiber lasers each configured to generate pumplight;
   a seed laser source configured to generate a seed signal; and
   a thulium-doped pumped fiber laser configured to receive the pumplight from the multiple thulium-doped pumping fiber lasers and the seed signal from the seed laser source, the thulium-doped pumped fiber laser also configured to amplify the seed signal using the pumplight, wherein the thulium-doped pumped fiber laser comprises:
      a signal combiner comprising multiple pigtail fibers configured to receive the pumplight from the multiple thulium-doped pumping fiber lasers and the seed signal from the seed laser source, wherein each of the multiple pigtail fibers comprises a cladding and a core, the cladding of each pigtail fiber longitudinally down-tapered such that a diameter of the cladding decreases along at least a portion of a length of the pigtail fiber while a diameter of the core remains substantially constant, wherein the signal combiner is configured to support tandem pumping of the thulium-doped pumped fiber laser using the multiple thulium-doped pumping fiber lasers while transporting predominately single-transverse-mode beams; and
      a fiber gain medium connected to an output of the signal combiner, the fiber gain medium comprising a core configured to receive the seed signal from the signal combiner and a cladding configured to receive the pumplight from the signal combiner;
   wherein the multiple thulium-doped pumping fiber lasers are configured to forward-pump the thulium-doped pumped fiber laser so that an output from the thulium-doped pumped fiber laser has a longer wavelength than the pumplight; and
   wherein the core of the fiber gain medium is doped with thulium, the fiber gain medium being longitudinally up-tapered such that a diameter of the core and a diameter of the cladding of the fiber gain medium increase along at least a portion of a length of the fiber gain medium.

2. The system of claim 1, wherein the thulium-doped pumped fiber laser is configured to generate an output beam having an average power level of at least 1 kW.

3. The system of claim 1, wherein the fiber gain medium has a bleached absorption profile in part of the fiber gain medium and an unbleached pump absorption profile in another part of the fiber gain medium.

4. The system of claim 1, wherein the fiber gain medium comprises:
   a first portion in which the diameters of the core and the cladding of the fiber gain medium are smaller;
   a second portion in which the diameters of the core and the cladding of the fiber gain medium increase; and
   a third portion in which the diameters of the core and the cladding of the fiber gain medium are larger.

5. The system of claim 4, wherein the fiber gain medium is configured such that at least a majority of optical amplification within the fiber gain medium occurs within the third portion of the fiber gain medium.

6. The system of claim 5, wherein at least the majority of the optical amplification occurring within the third portion of the fiber gain medium results in a threshold power for nonlinear effects that is below a power level of the seed signal.

7. The system of claim 1, wherein the multiple thulium-doped pumping fiber lasers are configured to generate the pumplight having a wavelength between about 1900 nm and about 1950 nm.

8. The system of claim 1, wherein an overall combined first cross-sectional dimension of the multiple pigtail fibers substantially matches a second cross-sectional dimension of the fiber gain medium.

9. The system of claim 1, wherein the system has a spectral linewidth of less than 1 GHz.

10. A method comprising:
generating pumplight using each of multiple thulium-doped pumping fiber lasers;
generating a seed signal using a seed laser source;
receiving the pumplight from the multiple thulium-doped pumping fiber lasers and the seed signal from the seed laser source at a thulium-doped pumped fiber laser, wherein:
receiving the pumplight and the seed signal at the thulium-doped pumped fiber laser comprises receiving the pumplight from the multiple thulium-doped pumping fiber lasers and the seed signal from the seed laser source at a signal combiner comprising multiple pigtail fibers;
each of the multiple pigtail fibers comprises a cladding and a core, the cladding of each pigtail fiber longitudinally down-tapered such that a diameter of the cladding of the pigtail fiber decreases along at least a portion of a length of the pigtail fiber while a diameter of the core remains substantially constant; and
an overall combined first cross-sectional dimension of the multiple pigtail fibers substantially matches a second cross-sectional dimension of a fiber gain medium of the thulium-doped pumped fiber laser; and
amplifying the seed signal based on the pumplight using the thulium-doped pumped fiber laser;
wherein the multiple thulium-doped pumping fiber lasers forward-pump the thulium-doped pumped fiber laser so that an output from the thulium-doped pumped fiber laser has a longer wavelength than the pumplight;
wherein the fiber gain medium comprises a core doped with thulium and a cladding, the fiber gain medium being longitudinally up-tapered such that a diameter of the core and a diameter of the cladding of the fiber gain medium increase along at least a portion of a length of the fiber gain medium;
wherein the seed signal is provided to the core of the fiber gain medium by the signal combiner and the pumplight is provided to the cladding of the fiber gain medium by the signal combiner; and
wherein the signal combiner supports tandem pumping of the thulium-doped pumped fiber laser using the multiple thulium-doped pumping fiber lasers while transporting predominately single-transverse-mode beams.

11. The method of claim 10, wherein the thulium-doped pumped fiber laser generates an output beam having an average power level of at least 1 kW.

12. The method of claim 10, wherein the fiber gain medium has a bleached absorption profile in part of the fiber gain medium and an unbleached pump absorption profile in another part of the fiber gain medium.

13. The method of claim 10, wherein the fiber gain medium comprises:
a first portion in which the diameters of the core and the cladding of the fiber gain medium are smaller;
a second portion in which the diameters of the core and the cladding of the fiber gain medium increase; and
a third portion in which the diameters of the core and the cladding of the fiber gain medium are larger.

14. The method of claim 13, wherein at least a majority of optical amplification within the fiber gain medium occurs within the third portion of the fiber gain medium.

15. The method of claim 14, wherein at least the majority of the optical amplification occurring within the third portion of the fiber gain medium results in a threshold power for nonlinear effects that is below a power level of the seed signal.

16. The method of claim 10, wherein the multiple thulium-doped pumping fiber lasers generate the pumplight having a wavelength between about 1900 nm and about 1950 nm.

17. The method of claim 10, further comprising providing a spectral linewidth of less than 1 GHz.

18. A system comprising:
multiple thulium-doped pumping fiber lasers each configured to generate pumplight;
a seed laser source configured to generate a seed signal;
a thulium-doped pumped fiber laser configured to receive the pumplight from the multiple thulium-doped pumping fiber lasers and the seed signal from the seed laser source, the thulium-doped pumped fiber laser also configured to amplify the seed signal using the pumplight and generate an output beam having an average power level of at least 1 kW, wherein the thulium-doped pumped fiber laser comprises:
a signal combiner comprising multiple pigtail fibers configured to receive the pumplight from the multiple thulium-doped pumping fiber lasers and the seed signal from the seed laser source, wherein each of the multiple pigtail fibers comprises a cladding and a core, the cladding of each pigtail fiber longitudinally down-tapered such that a diameter of the cladding decreases along at least a portion of a length of the pigtail fiber while a diameter of the core remains substantially constant, wherein the signal combiner is configured to support tandem pumping of the thulium-doped pumped fiber laser using the multiple thulium-doped pumping fiber lasers while transporting predominately single-transverse-mode beams; and
a fiber gain medium connected to an output of the signal combiner, the fiber gain medium comprising a core configured to receive the seed signal from the signal combiner and a cladding configured to receive the pumplight from the signal combiner;
wherein an overall combined first cross-sectional dimension of the multiple pigtail fibers substantially matches a second cross-sectional dimension of the fiber gain medium;
wherein the multiple thulium-doped pumping fiber lasers are configured to forward-pump the thulium-doped pumped fiber laser so that an output from the thulium-doped pumped fiber laser has a longer wavelength than the pumplight; and
wherein the core of the fiber gain medium is doped with thulium, the fiber gain medium being longitudinally up-tapered such that a diameter of the core and a diameter of the cladding of the fiber gain medium increase along at least a portion of a length of the fiber gain medium.

19. The system of claim 1, wherein the multiple thulium-doped pumping fiber lasers, the seed laser source, and the thulium-doped pumped fiber laser form a fiber amplifier.

20. The system of claim 18, wherein the multiple thulium-doped pumping fiber lasers, the seed laser source, and the thulium-doped pumped fiber laser form a fiber amplifier.

\* \* \* \* \*